Feb. 1, 1955      F. H. WELLS      2,701,303
ELECTRONIC VALVE CIRCUITS
Filed March 1, 1950
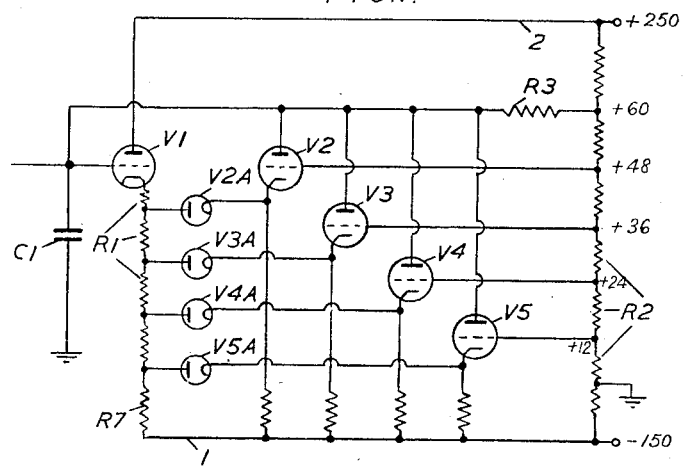
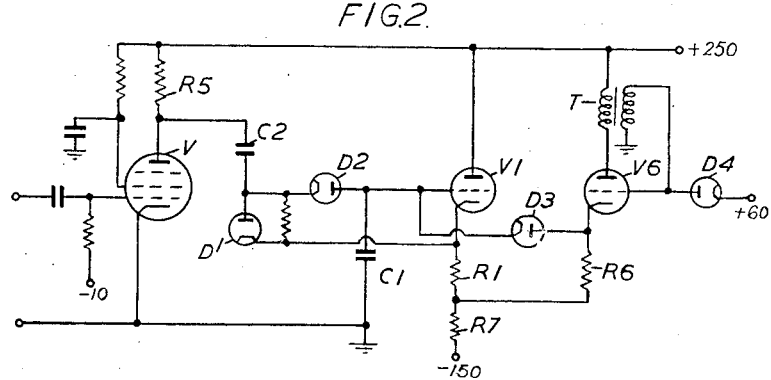
Inventor
FRANK HERBERT WELLS
By Robert B. Carson
Attorney

United States Patent Office 2,701,303
Patented Feb. 1, 1955

2,701,303

ELECTRONIC VALVE CIRCUITS

Frank Herbert Wells, London, England, assignor, by mesne assignments, to National Research Development Corporation, London, England, a corporation of Great Britain Application March 1, 1950, Serial No. 147,001

4 Claims. (Cl. 250—27)

This invention relates to electronic valve circuits which can be stepped through a series of stable conditions.

Forms of the well known multi-vibrator circuit are in extensive use as double-stability circuits triggered from one condition to another by successive pulses. Ring circuits of intercoupled valves are also available in which each valve is rendered conductive in turn by pulses applied to a common input circuit.

The present invention is concerned with stepping from one stable condition to another under the influence of a voltage changing steadily or stepwise, for example the voltage of a condenser charged steadily or by a succession of pulses. It is also concerned with scalers for counting electrical pulses by cumulatively pulse charging a condenser and with circuits for stabilising a condenser charge at a series of voltage levels. In one aspect of the invention several electronic valves with graded bias are arranged to become conductive in succession under the influence of a progressively changing voltage and so to change in steps the voltage across a common load impedance.

In a development of this aspect, the output voltage is fed back to the input circuit of a preceding valve from which the progressively changing voltage is derived, thereby stabilising the input voltage at a succession of values.

In an important application, the input circuit comprises a condenser the charge on which is progressively changed by uniform pulses applied through a resistance, so that the condenser voltage is a measure of the number of pulses. The effect of feedback is then to maintain the condenser voltage at a value close to that set up by preceding pulses, pending the arrival of another pulse and despite any leakage tending to alter the condenser voltage.

To this end, direct inter-valve and feed-back couplings for the transfer of D. C. voltages are employed.

In another aspect of the invention, a step-charged condenser circuit comprises a condenser fed with positive or negative charges through a rectifier and a blocking oscillator triggered by the condenser voltage, when that voltage reaches a terminal value to reset the condenser voltage. Triggering of the blocking oscillator indicates that a predetermined number of pulses have reached the condenser; a pulse may be taken from the blocking oscillator for further counting in multiples.

The condenser voltage is preferably stabilised at successive steps by feedback from valves rendered conductive in succession by the application of the condenser voltage.

Arrangements embodying the invention will now be described with reference to the accompanying drawing.

The circuit shown in Fig. 1 of the drawing is one having a series of stable conditions with feedback to stabilize the stepped charging of a condenser C1.

The condenser C1 is assumed to have a standing voltage of 60 volts upon it, which voltage is reduced in 12 volt steps by applied pulses, and is then restored to its initial value. The means for the step-charging of the condenser and for its discharge is not shown in Fig. 1; it may be as commonly employed in the art; a preferred circuit for the purpose is shown in Fig. 2.

Referring to Fig. 1, the circuit comprises a cathode follower valve V1 having the condenser C1 in its input circuit and a resistance chain R1 and main resistance R7 as output resistance connected between its cathode and a negative supply line 1. A series of valves V2, V3, V4, V5 is provided, with graded positive bias connections to their control grids, the bias voltages corresponding to the voltage steps to be built up on condenser C1 and being derived from a resistance chain R2 connected between ground and a positive supply line 2. The valves have individual resistances in their cathode connections to the negative line 1 and a common anode resistance R3 connected to the chain R2 at a point of 60 volts potential. The anode-connected end of resistance R3 is directly connected to the control grid of V1 so determining the standing voltage on this grid and on the condenser C1. When in the operation of the circuit, any of the valves V2 to V5 passes current, a voltage drop occurs in resistance R3 so that the said standing voltage is reduced. Thus the direct connection from R3 to the grid of V1 is a feed-back connection affecting the condenser voltage.

Initially however the valves V2 to V5 are subject to cut-off voltages by means of connections from their cathodes through diode rectifiers V2A to V5A to positive points in the resistance chain R1.

When an input pulse of predetermined amplitude and duration and of correct sense is applied to condenser C1, the condenser voltage falls rapidly from 60 to 48 volts and the voltages along the resistance chain R1 fall proportionately, that is, a matter of a few volts across each junction. Consequently the cathode voltages at V2 to V5 are reduced, and in particular the cathode voltage of V2 falls below 48 volts (the grid voltage on this valve), so that current flows in V2 and the diode V2A becomes non-conducting. Anode resistance R3 is of a high value and thus the anode voltage of V2 is brought down approximately to the grid voltage, whereupon the grid takes current in the ratio, relatively to the anode, of about 4:1. The total cathode current is, however, made self limiting by automatic bias developed across the cathode load resistor. Hence when the voltage on condenser C1 reaches 48 volts and the pulse of charge ceases, it is held at that value by the feed-back connection from resistance R3, this resistance although high being much lower in value than stray leakage resistance across C1.

This condition is maintained until the arrival of another pulse which forces the condenser voltage down to 36 volts and at the same time causes valve V3 to become conducting to stabilise the condenser voltage at the new value.

Valves V4 and V5 stabilise the condenser voltage in a similar manner at values of 24 and 12 volts respectively. Thereafter the condenser is restored to 60 volts by external circuit means, the valves V2 to V5 are automatically cut-off and the condenser voltage is maintained by the connection through R3 until the next cycle is initiated by another pulse. The preferred circuit for stepping the condenser charge, shown in Fig. 2 operates in the following manner, the step-charged condenser C1 and the cathode-follower valve V1 of Fig. 1 being similarly identified in Fig. 2.

Input positive pulses are applied to the grid of a pentode amplifier valve V which is biassed to cut-off. A large current consequently flows and the anode voltage falls from say 250 to 20 causing a fall in the charge on condensers C2 and C1, current flowing through a diode rectifier D2. A second diode D1 is during this time ineffective as its anode is a few volts negative to its cathode. A step of voltage appears across C1 of approximately $$\frac{230 \cdot C2}{C1 + C2}$$

volts which is made, in the present example, equal to 12 volts by choice of capacity values. At the end of the pulse the anode voltage of V returns to 250. During this time D1 passes current but D2 does not, so that the voltage on condenser C1 is left intact.

In a similar way successive pulses reduce the condenser voltage in 12 volt steps. The restoring circuit for condenser C1 comprises a blocking oscillator V6 having its control grid grounded through a winding of an inductive coupling T between the anode and grid circuits. The cathode is connected through a resistance R6 to the main cathode resistance R7 of valve V1.

When the fifth pulse of a series reduces the voltage of condenser C1 below 12 volts, the voltage across R1 falls in a final step and the cathode of V6 is driven negative so that this valve "blocks," producing through the inductive coupling a positive voltage pulse on its grid limited to 60 volts by a connection including a diode rectifier D4 to a 60 volt supply point.

The positive grid pulse causes a rapid increase in cathode current, the cathode voltage rises until the cut-off condition at about 60 volts is reached, and in rising charges the condenser C1 through a diode rectifier D3 so that the initial charge condition on this condenser is restored. When the cut-off condition in valve V6 is reached, the grid voltage on this valve falls back to zero and diode D3 becomes non-conducting as the V6 cathode voltage falls a few volts to the level set by the cathode-follower valve V1. The circuit is then in a condition to receive and count another series of pulses.

In reference again to Fig. 1, it will be seen that valves V2 to V5 pass through a series of stable conditions to develop a stepped voltage across resistance R3 from a progressively falling voltage applied across resistance chain R1. A circuit with such a characteristic is useful in itself, as well as constituting a useful feed-back network for stabilising in steps the input voltage to an amplifier such as V1.

I claim:

1. A stepping circuit for providing a direct current output stepped as a direct current input passes through predetermined levels comprising an input resistance chain, a plurality of grid-controlled tubes each having a plate and a cathode and having a common load impedance and individual cathode resistors connected to a common cathode line, means providing graded bias to the grids of said tubes, a connection from each of the cathodes of said tubes to selected points in said resistance chain and unidirectional conducting means in said connections adapted to draw current through said cathode resistors to maintain the tubes cut off until the potentials in the resistance chain fall below the cathode potentials whereat said means cease to draw current so that the tubes become conducting in sequence as the potential across the chain decreases.

2. A stepping circuit for providing a direct current output stepped as a direct current input passes through predetermined levels comprising an input resistance chain, a plurality of grid controlled tubes each having a plate and a cathode and having a common load impedance and individual cathode resistors connected to a common cathode line, means providing graded bias to the grids of said tubes, a connection from each of the cathodes of said tubes to selected points in said resistance chain and rectifier means in said connections connected in a sense to draw current through said cathode resistors until the potentials in the resistance chain fall below limits selected to operate respective tubes.

3. A circuit for stabilizing the voltage across a condenser for each fixed amount of charge withdrawn from the condenser comprising a vacuum tube amplifier grid-connected to one plate of the condenser having the other plate connected to a point of fixed potential, a cathode load resistance for said amplifier comprising a resistance chain having connections taken from points along the chain, a plurality of grid controlled vacuum tubes each having a plate and a cathode and having a common anode load impedance and individual cathode resistors connected to a common cathode line, means providing graded bias to the grids of said plurality of tubes, a unidirectional conducting means having an anode and a cathode in each of said connections taken from points along the resistance chain to couple with respective cathodes of said plurality of tubes, the unidirectional conducting means being anode connected with the resistance chain, and a feed back connection from the common anode impedance to the grid connected plate of the condenser.

4. A circuit comprising a condenser having one plate connected to a point of fixed potential and the other plate connected to an input terminal, a cathode follower valve amplifier having at least a grid and a cathode and being grid-connected to the plate of the condenser connected to the input terminal and having a cathode load resistor in the form of a resistance chain, connections from points along said chain, each connection comprising a rectifier having an anode and a cathode and being anode connected to the resistance chain, a series of grid controlled valves each having a plate and a cathode, a connection from the cathode of each rectifier to the cathode of one of said grid controlled valves, a further resistance chain having connections to the grids of said grid controlled valves so that the bias to said grids is graded in the same sense as the potentials applied to the anodes of said rectifiers, a cathode resistor for each of said series of valves, a common connection for said cathode resistors connected to a point of fixed potential, a common anode load resistor for said series of valves and a connection from the anodes of said series of valves to the grid of the cathode follower valve.

References Cited in the file of this patent

UNITED STATES PATENTS

| | | |
|---|---|---|
| 2,008,563 | Sarbey | July 16, 1935 |
| 2,095,124 | Cockrell | Oct. 5, 1937 |
| 2,396,439 | Schlesinger | Mar. 12, 1946 |
| 2,415,567 | Schoenfeld | Feb. 11, 1947 |
| 2,479,881 | Wagner | Aug. 23, 1949 |
| 2,486,391 | Cunningham | Nov. 1, 1949 |
| 2,487,191 | Smith | Nov. 8, 1949 |
| 2,498,678 | Grieg | Feb. 28, 1950 |
| 2,602,918 | Kretzmer | July 8, 1952 |